Aug. 25, 1931.   A. R. HOEFT   1,820,071
POULTRY FEEDER
Filed Nov. 7, 1929   2 Sheets-Sheet 1

Inventor:
Adolph R. Hoeft
By Arthur Wm Nelson
Atty

Aug. 25, 1931.    A. R. HOEFT    1,820,071
POULTRY FEEDER
Filed Nov. 7, 1929    2 Sheets-Sheet 2
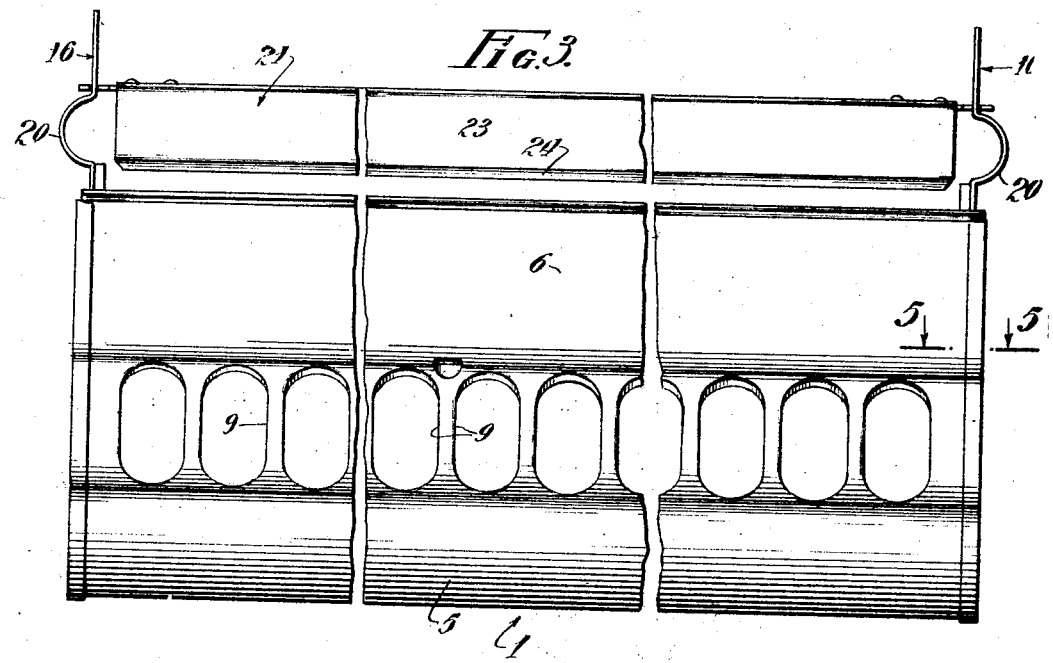
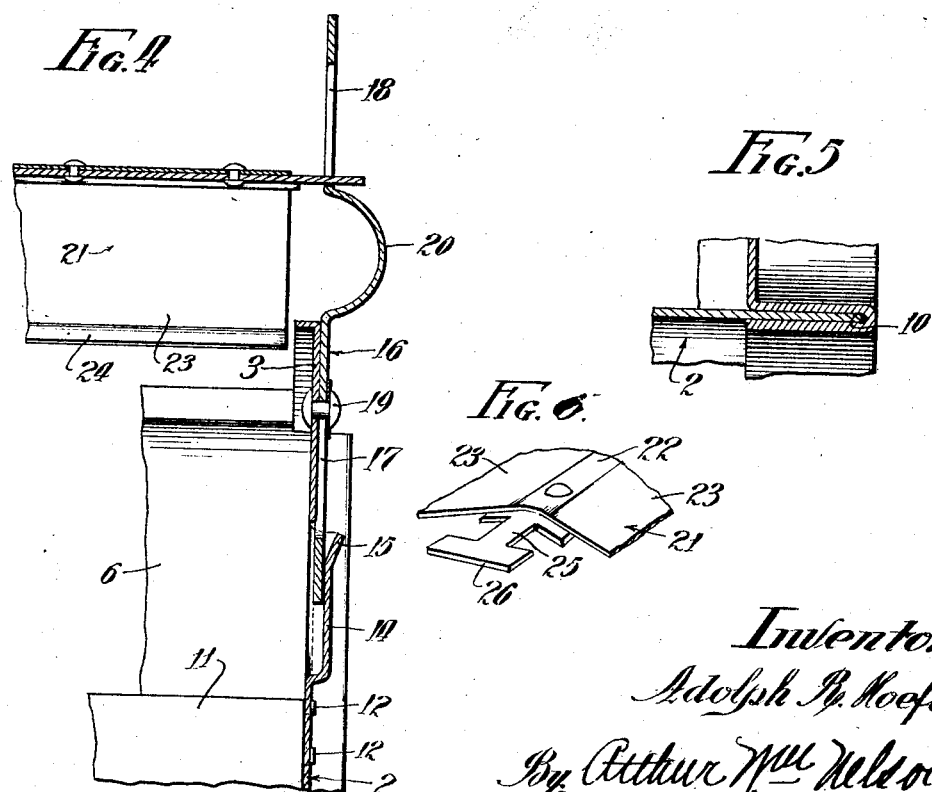

Patented Aug. 25, 1931

1,820,071

UNITED STATES PATENT OFFICE

ADOLPH R. HOEFT, OF EVANSTON, ILLINOIS, ASSIGNOR TO HOEFT & COMPANY, INC., OF NORTH CHICAGO, ILLINOIS, A CORPORATION OF ILLINOIS

POULTRY FEEDER

Application filed November 7, 1929. Serial No. 405,325.

This invention relates to improvements in poultry feeders and it consists of the matters hereinafter described and more particularly pointed out in the appended claims.

The invention is particularly adapted to that type of feeder including a trough and a cover or top above the same and the primary object of the invention is to provide a novel connection between the cover and end plates of the trough, whereby the cover is not only normally mounted for a swinging or rocking movement, but may be moved into a position to one side of the trough when cleaning or refilling the same and this without a complete disconnection between the cover and end members.

This object of the invention as well as others, together with the many advantages thereof, will more fully appear as I proceed with my specification.

In the drawings:—

Fig. 3 is a view in side elevation of the improved feeder with the parts thereof in the position shown in Fig. 1.

Fig. 4 is a vertical detail sectional view on an enlarged scale, through an end of the feeder, as taken on the line 4—4 of Fig. 1.

Fig. 5 is a detail horizontal sectional view also on an enlarged scale, as taken on the line 5—5 of Fig. 3.

Fig. 6 is a detail perspective view illustrating the trunning at each side of the cover or top.

The invention is herein illustrated as applied to feeders especially adapted for baby chicks but as will be apparent the invention is also applicable to feeders for older and more mature stock.

Figure 2:
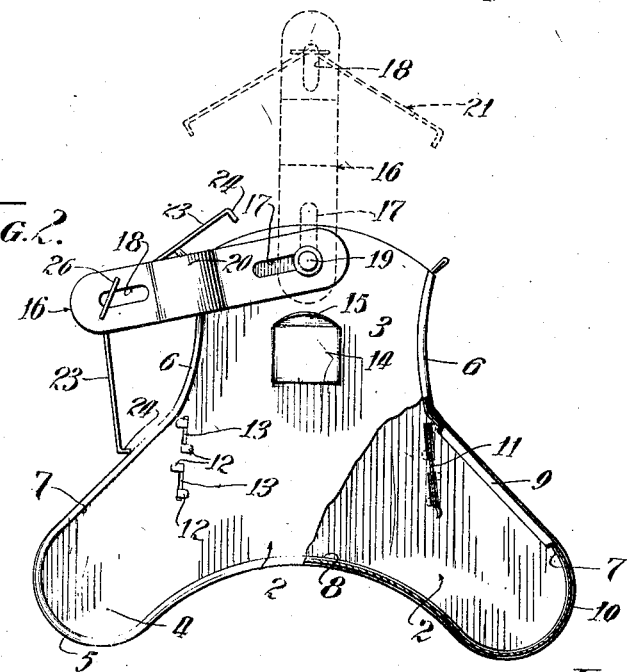
Fig. 2 is a view similar to Fig. 1, with certain parts shown in a changed position and with other parts broken away to more clearly show the interior construction.

Referring now in detail to that embodiment of the invention illustrated in the accompanying drawings, 1 indicates as a whole the open top trough of the feeder with which there is associated upright end plates or members 2—2, all preferably made of sheet metal. Each end plate or member comprises a central upstanding body part 3 and diverging legs 4—4 having rounded ends 5. The trough has substantially upright side wall parts 6 which are flanged along their top margins for strength, inclined wall part 7 and curved bottom wall part 8, which follow the contour or outline of the end plates or members 2 as best shown in Fig. 2. In the inclined side wall parts 7 are formed flanged openings 9 through which the chicks feed.

Each end plate is formed with a marginal groove 10 as best shown in 5 to receive the end portions of the various walls of the trough. In each side of the trough is provided a baffle 11 which forms a continuation of the associated top wall part 6 to prevent the feed, when the trough is filled, from flowing out through the feed openings 9. Each baffle 11 is provided at each end with bendable prongs 12 that extend through slots 13 in the end plates or members 2 and are bent over in opposite directions to connect the end plates together in assembled relation. In the upstanding body part 3 of each end plate, on the vertical median line thereof is provided an open top pocket 14 formed by depressing or punching outwardly a rectangular area or portion of said body part, said portion having an outwardly inclined lip 15 at its top end.

Associated with each end plate or member is a link member or top supporting arm 16 made of flat strap metal. Said arm is provided at its top and bottom ends with longitudinal slots 17 and 18 respectively and a headed rivet 19 fixed in the upstanding body part 3 above the pocket 14, extends through the bottom slot 17. Between said slots said link member or arm 16 is formed with a curved part 20, not only to pass the top ends of the flange providing the grooves 10 in the end members, when said link member or arm is swung to one side or the other as will later appear but also to permit the flexing of said arms when necessary.

Figure 1:
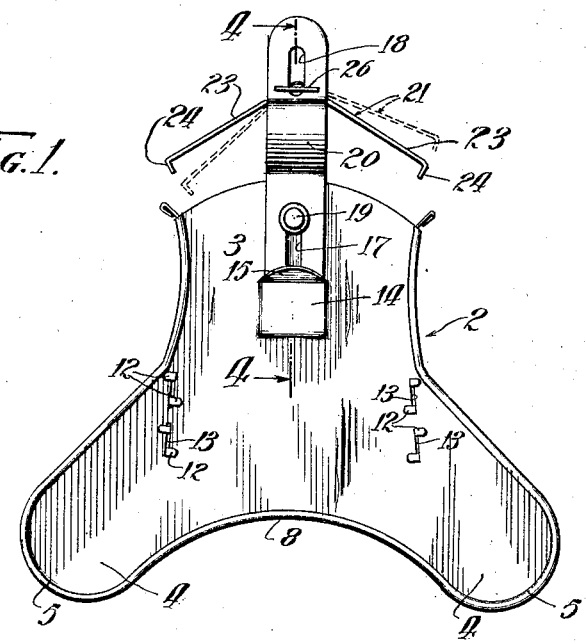
Fig. 1 is a view in end elevation of a poultry feeder embodying my invention.

Above the open top of the trough and operatively connected to the link members or arms 16 for support, is a top or cover 21 having a central ridge portion 22 and downwardly and outwardly diverging side portions 23 each terminating in a flange 24 for stiffening purposes. Said top or cover is of a width approximating that of the open top end of the trough as best shown in Fig. 1 and to each end of the ridge portion is secured a substantially T-shaped trunnion including a neck 25 and a cross head 26. The neck is of a width approximating that of the top slot 18 of the link members or arm 16 while the cross head is of a width a trifle less than the length of said slot.

To insert the cross head 26 through the slot 18 the top or cover is disposed in that position wherein said cross head stands in the plane of said slot, the arms 16 being sprung slightly outwardly. This springing of said arms is readily permitted by the curved portion 20 in each arm. After the cross heads of the top members have been inserted through the slots 18 of both arms 16, it will balance to assume the position shown in Fig. 1.

When the arms 16 are arranged with their bottom ends disposed in the pockets 14 of the associated end plates or members, they will stand upright and should any of the feeding chicks, hop upon the cover, it will rock on its trunnions and the chicks will immediately hop off of the same. Thus roosting of the chicks on said top is discouraged and they will soon give up in their attempts to so roost.

The feed trough shown is made in substantial lengths and therefore it would be difficult to remove the top or cover and then replace the same, each time it is desired to clean or refill the trough. By a simple lift upwardly on the top or cover, the trunnion necks 25 move to the top ends of the slots 18 and then the bottom ends of the arms 16 are freed from the associated pockets 14 as shown in dotted lines in Fig. 2. The top or cover may then be swung to one side or the other of the trough when the flange 24 of one side portion 23 of the top will engage the legs of the end plates 2 and the other side portion 23 will engage upon the flanged top end of the adjacent side wall part of the trough as best shown in full lines in Fig. 2.

With the parts in this position the open top of the trough is substantially exposed for cleaning out and refilling the trough with feed, which is preferably a dry feed.

To replace the cover, it is swung back over the open top of the trough until the link members or arms stand upright, when a gentle downward pressure will insure the entrance of the bottom ends of said arms into the associated pockets 14 as shown in full lines in Fig. 1. In this respect, it is pointed out that the lip 15 of each pocket will guide said bottom ends of said arms into said pockets.

Thus the top or cover may be quickly manipulated for cleaning and refilling the trough and it is free to rock to prevent roosting of the chicks upon the same.

The parts are so arranged that they may be shipped in knockdown condition in compact packages and the feeder may be readily assembled for use and this without the aid of tools.

While in describing my invention, I have referred in detail to the form, arrangement and construction of the various parts thereof, the same is to be considered merely as illustrative so that I do not wish to be limited thereto except as may be specifically set forth in the appended claims.

I claim as my invention:

1. A feeder of the kind described embodying therein a feed trough including end members, a top normally disposed above the trough, a supporting member for said top associated and having a pin and slot connection with each end member and means on each end member forming pockets adapted to detachably receive the bottom end of an associated top supporting member and coacting with said pin and slot connection thereof to hold said supporting member in a definite position against pivotal movement.

2. A feeder of the kind described embodying therein a feed trough including end members, links each having a pin and slot pivotal connection with an associated end member, a top for said trough rockably supported in one end of said links and means on each end member adapted to be detachably engaged by the other end of said link and coacting with the pin and slot connection thereof to hold said link in a position against pivotal movement.

3. A feeder of the kind described embodying therein a feed trough having an end member, a normally disposed upright link having a pin and slot pivotal connection near one end with said end member, means on said end member adapted to be detachably engaged by said end of said link and coacting with said pin and slot connection to hold the link in upright position and a cover operatively connected with the other end of said link.

4. In a feeder of the kind described, an upright end member, a normally upright link having a pin and slot pivotal connection with said end member, and means on said end member adapted to detachably receive one end of said link and to coact with said pin and slot connection to hold said link in upright position.

5. In a feeder of the kind described, an upright end member, a normally upright link having a pin and slot pivotal connection with said end member, and a pocket punched from said end member and adapted to detachably receive one end of said link and to coact with said pin and slot connection to hold said link in upright position.

6. In a feeder of the kind described, an upright end member, a normally upright link having a pin and slot connection near one end with said end member and having an opening in its other end, means on said end member adapted to detachably receive the first mentioned end of the link and to coact with said pin and slot connection to hold said link in upright position, a top member and a trunnion fixed to said top member and detachably engaged in the opening in the other end of said link, which link is formed for flexing at a point between its ends to permit insertion and withdrawal of the trunnion fixed to said top member, into and out of said opening.

In testimony whereof, I have hereunto set my hand, this 30th day of October, 1929.

ADOLPH R. HOEFT.